March 22, 1966  C. L. RASSIEUR  3,241,624
EARTH BORING EQUIPMENT INCLUDING TWO
PART ROTARY CUTTING HEAD
Filed Jan. 24, 1963  5 Sheets-Sheet 3
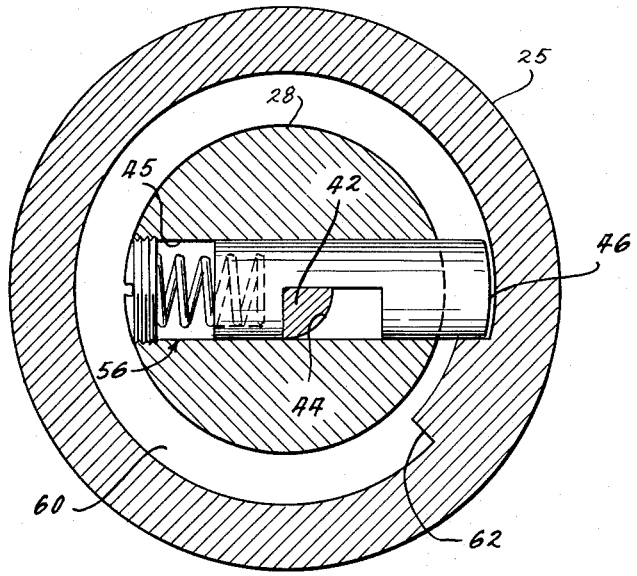
FIG 3
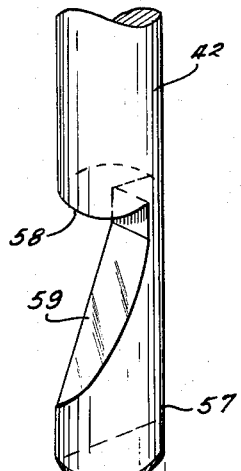
FIG. 4
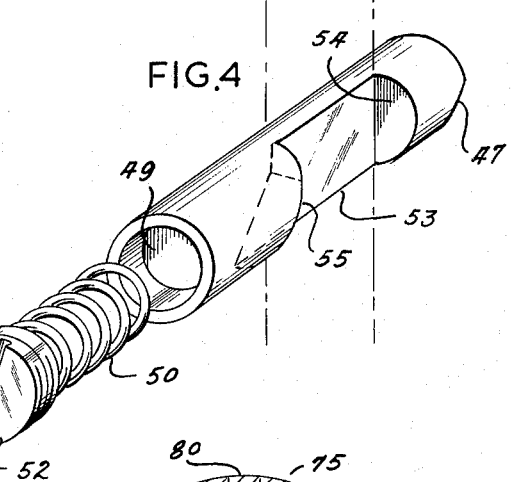
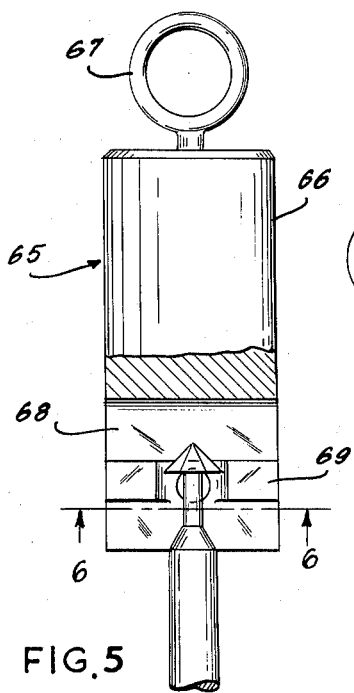
FIG. 5
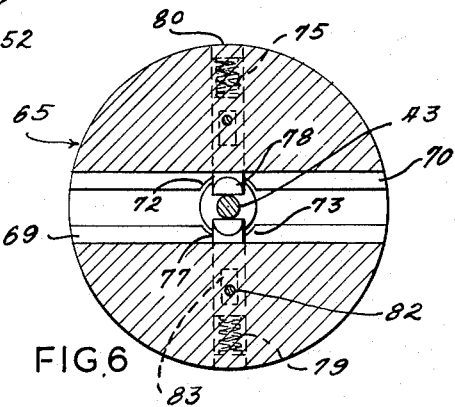
FIG. 6

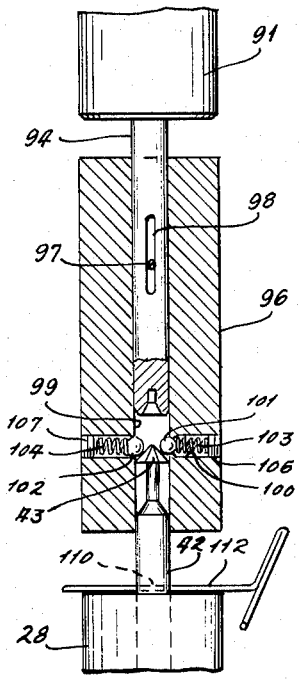
FIG.9
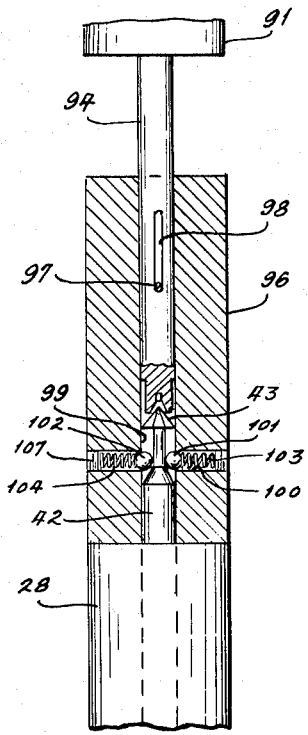
FIG.10
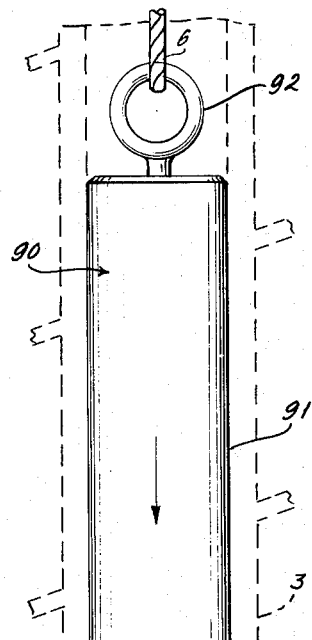
FIG.11
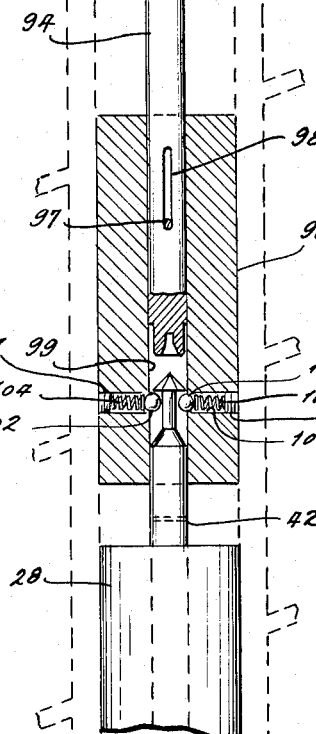
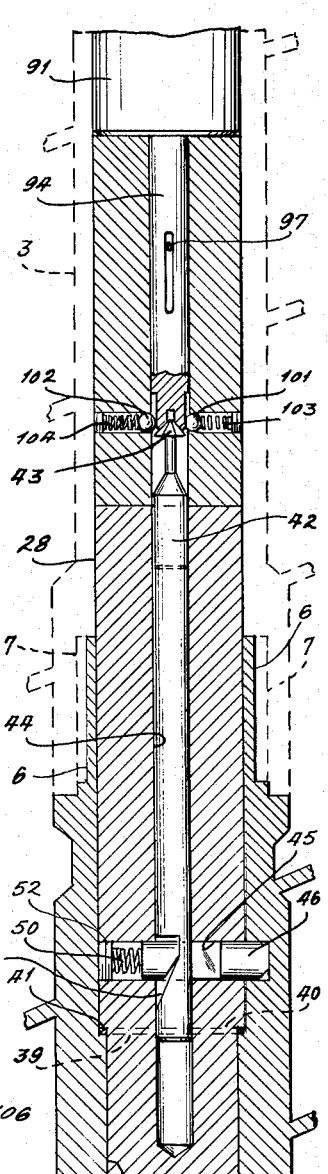
FIG.12

United States Patent Office 3,241,624
Patented Mar. 22, 1966

3,241,624
EARTH BORING EQUIPMENT INCLUDING TWO
PART ROTARY CUTTING HEAD
Charles L. Rassieur, University City, Mo., assignor to
Central Mine Equipment Company, St. Louis, Mo., a
corporation of Missouri
Filed Jan. 24, 1963, Ser. No. 253,626
6 Claims. (Cl. 175—257)

This invention relates to earth boring equipment which includes a two part rotary cutting head, and more specifically with a cutting head including an outside part that is hollow, an inside part latched in place therein, and the necessary tools for removing and replacing the inside cutting head part while the cutting head is connected to the end of a hollow drill string such as a string of hollow auger sections detachably connected end to end and to the cutting head.

The earth boring equipment to which this invention relates is often used to drive an exploratory hole to depths of 200–300 feet below the earth surface. In order to explore the strata penetrated by the bit, earth samples are taken as the drilling progresses in depth by using separate kinds of tools, such as a sample tool, or a core barrel. It will be readily appreciated that the recovery of a sample by separate tools, for this purpose, could require removal of the earth boring equipment in order to attain access to the bottom of the hole. Any earth boring equipment therefore, which expedites the procedure for obtaining access to the bottom of the hole in order to obtain a sample, would represent a distinct advance in the art.

Usually the above-described operations are performed by a crew of men operating a portable rig which includes a vertical derrick and a power operated rotary driving head which can be raised and lowered. The rotary driving head in turn is coupled to the end of one, or more, sections of pipe, or rod, connected end to end to form a drill string extending into the hole. Connected to the end of the drill string is the rotary cutting head driven through its conneection with the drill string from the rotary driving head. Jacks are usually used to force the cutting head into the earth while it is being rotated by the rotary driving head. As the hole progresses in depth, more sections are added to the drill string. Each section is coupled to the next adjacent section below it by a suitable coupling. This coupling can be the threaded type, or the like. It will be apparent that if this drilling equipment, above-described, is to be withdrawn from the hole in order to take a sample, it must be disassembled section by section as the drill string is raised from the hole and then reassembled after the sampling operation is completed.

Since this method represents a considerable expenditure of time and labor, there is much demand for equipment which would permit passage of a sampling tool through a hollow drill string and the cutting head to the bottom of the hole. One form of such equipment is shown in a prior application by Theodore E. Rassieur, Serial No. 18,570, filed March 30, 1960. In this prior application is shown drilling equipment in which a plug in the cutting head separately driven through a string of drill rod can be removed by disassembling the rod section by section to thereby provide a through passage through the drill string to the bottom of the hole for the purpose of taking a sample. This particular invention represents a further improvement in this type of equipment to speed up the sample taking operation.

It is one of the objects of this invention to provide equipment for earth boring which will accommodate the passage of a sampling tool.

It is still another object of this invention to provide a two part cutting head driven by a hollow drill string and means for removing one of the parts to provide for passage of a sample taking tool.

It is still another object of this invention to provide a two part cutting head in which one of the parts is a closure plug latched in position within the cutting head, which plug can be unlached and removed by a simple fishing operation performed through the hollow drill string.

It is still another object of this invention to provide a two part cutting head in which one of the parts is a removable plug easily replaced by the simple expedient of lowering it down the drill string when the sampling operation is completed.

It is still another object of this invention to provide suitable tools for removing and replacing one of the parts of a two part cutting head.

According to this invention, the actual earth boring operation is performed by a cutting head provided with a shank end for coupling to one end of a hollow drill string, such as a plurality of hollow auger sections. This cutting head is a two part structure or device. There is a center section, or part, detachably locked, or latched, within an outer section, or part, so as to form a cutting head. The end of the cutting head opposite the shank carries a plurality of replaceable bits. Some of these bits are grouped centrally of the cutting head and can be termed leading bits, or pilot bits. Still other bits are located on the cutting head to cut at the outer periphery of the hole and follow after the pilot bits. These bits can be termed trailing bits. The inner section, or part, of the cutting head is locked wih the outer section, or part, of the cutting head by a latch mechanism so as to resist relative axial movement between the sections, or parts, as well as relative rotary motion between the two sections. Both parts, or sections, carry one, or more, cutting bits and interfit one with the other to form the complete cutting head. Between the two parts, or sections, is a seal, or cushion, arranged so that when the inner part is inserted into the outer part a seal is formed to prevent the passage of foreign matter between the parts and a cushion to prevent damage of the parts on forcible engagement. This cushion prevents removal of the inner part from the outer part of the cutting head except in one direction which in turn is resisted by the latch. An operator for this latch projects upwardly of the cutting head through the shank and into the hollow drill string where it is accessible for operation by a fishing tool. Thus, when it is desired to remove the inner part of the cutting head, a fishing tool can be lowered down the drill string by a suitable cable to grasp the operator, release the latch by upward pull on the cable, and lift the inner part from the outer part up the drill string to the top where it can be removed. A fishing tool of the cable operated type is much easier and quicker in operation than removing a separate sectional inner drill rod section by section in order to remove the inner part of the cutting head such as in the prior Rassieur application wherein a sectional drill rod within the drill string is connected to drive the inner part of a sectional cutting head.

When the inner part of the cutting head is once removed from the top of the drill string, the passage is then opened from one end of the drill string through the cutting head to the bottom of the hole so that a sampling tool of suitable outside dimension may pass to the bottom of the hole through the string and cutting head, perform its operation, and be subsequently removed to recover the sample. Before the drilling progresses, however, the inner part of the cutting head must be replaced. This operation is performed by a cable operated tool called a replacing tool which can be coupled to the inner part of the cutting head, preferably with the operator to lower the inner part of the cutting head back into position within the outer part of the cutting head. The replacing tool is so constructed as to release its hold upon the inner part of the cutting head. After the replacing tool is removed from the drill string, drilling can proceed as before.

Other objects and advantages of this invention will appear from the following detailed description which is in such full, clear and concise terms as will enable any person skilled in the art to make and use the same when taken with the accompanying drawings, forming a part thereof, and in which:

FIG. 3 is a transverse section through the tool shown in FIG. 2 taken on the line 3—3 as viewed in the direction of the arrows;

FIG. 4 is an exploded view in perspective illustrating the parts of the latch and operator shown in FIGS. 2 and 3;

FIG. 5 is a front elevational view of a fishing tool with parts broken away so as to illustrate the manner of connection between the tool and the operator for the latch;

FIG. 6 is a transverse sectional view taken on the lines 6—6 of FIG. 5 as viewed in the direction of the arrows;

FIG. 9 is an elevational view with parts in section illustrating the manner of connecting the lowering tool, or jar, to the operator of the earth boring plug preparatory to replacing the plug in the cutting head;

FIG. 10 is an operational view showing some of the parts in section and illustrating the relationship between the parts after the lowering tool, or jar, has been connected to the operator of the plug during the step of replacing the plug in the cutting head;

FIG. 11 is an operational view illustrating the use of the replacement tool to lower the inner part of the cutting head; and FIG. 12 is a view similar to FIG. 9 illustrating the operation of the jar to disconnect the lowering tool from the latch operator of the plug.

The following detailed description will be confined to the details of the sectional type of cutting head and the tool specifically designed to disconnect and reconnect the parts of the cutting head, it being understood that other parts of the drilling equipment form no part of the instant invention.

Figure 1:
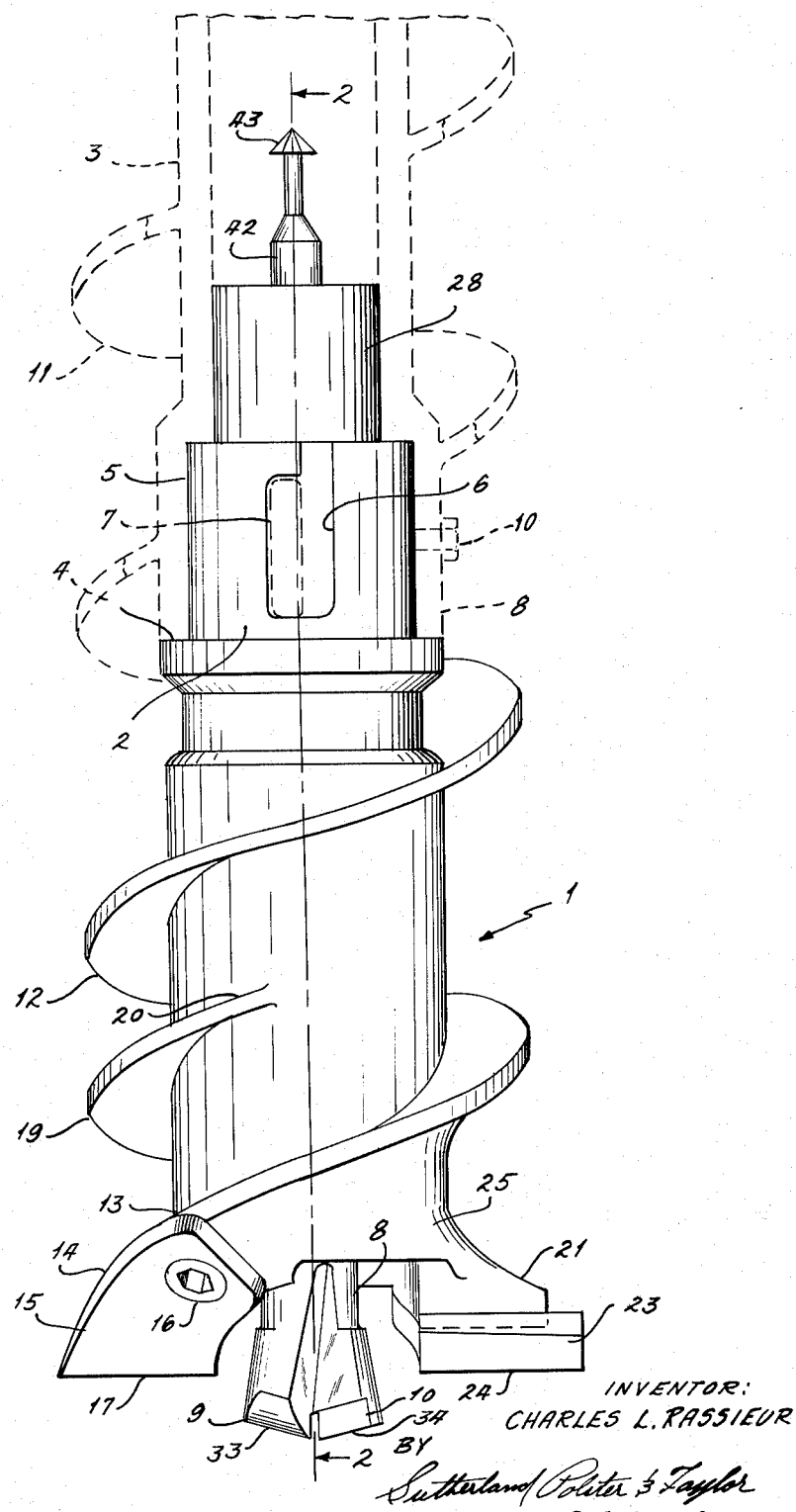
FIG. 1 is a front elevational view of an earth boring bit constructed in accordance with this invention and showing its connection with the lower end of a drill string illustrated in phantom lines.

As shown in FIG. 1, the cutting head, generally indicated as 1, has a hollow shank portion 2 carrying means for interconnection with hollow auger sections forming the drill string 3, shown in phantom lines. Shank 2 terminates in a collar forming a shoulder 4. A coupling part 5 on the shank is provided with a keyhole type of slot for receiving keys 7 on shank 2 internal of the coupling part 8 of a section of drill string 3. It will be understood that the drill string is made up of one or more of these sections extending upwardly to the drill rig, all of which may be interconnected in the manner described by slots, such as 6, and keys, such as 7. In order to prevent disconnection of the keys 7 from the slot 6, the coupling part 8 and the coupling part 5 have aligned holes receiving a locking bolt, or pin, 10. Auger flight 11 is secured around the drill string 3 and the coupling part 8 and is so arranged that when the drill string 3 is coupled to the cutting head 1, the end of the flight 11 will abut the end of a flight 12 at the shank 2 so as to form a continuous auger flight. The flight 12 is a continuous one which terminates at an edge 13 lying on a diameter through the earth boring bit 1, and this edge 13 is rabbeted at 14 to mate with a similar rabbeted surface on a bit 15 secured to the flight 12 by a bolt 16 recessed in the under surface of the flight. Bit 15 has a sharp cutting edge 17. There is also a flight 19 extending spirally of the cutting head and terminating at its upper end 20 intermediate turns of the flight 12 and at its lower end 21 on a line diametrically opposite the edge 13. End 21 is also rabbeted and has secured thereto a bit 23 with a cutting edge 24, all in the same manner as described heretofore for the bit 15. Bits 15 and 24 are trailing bits, both secured to what may be termed the outer part of the cutting head 25.

Figure 2:
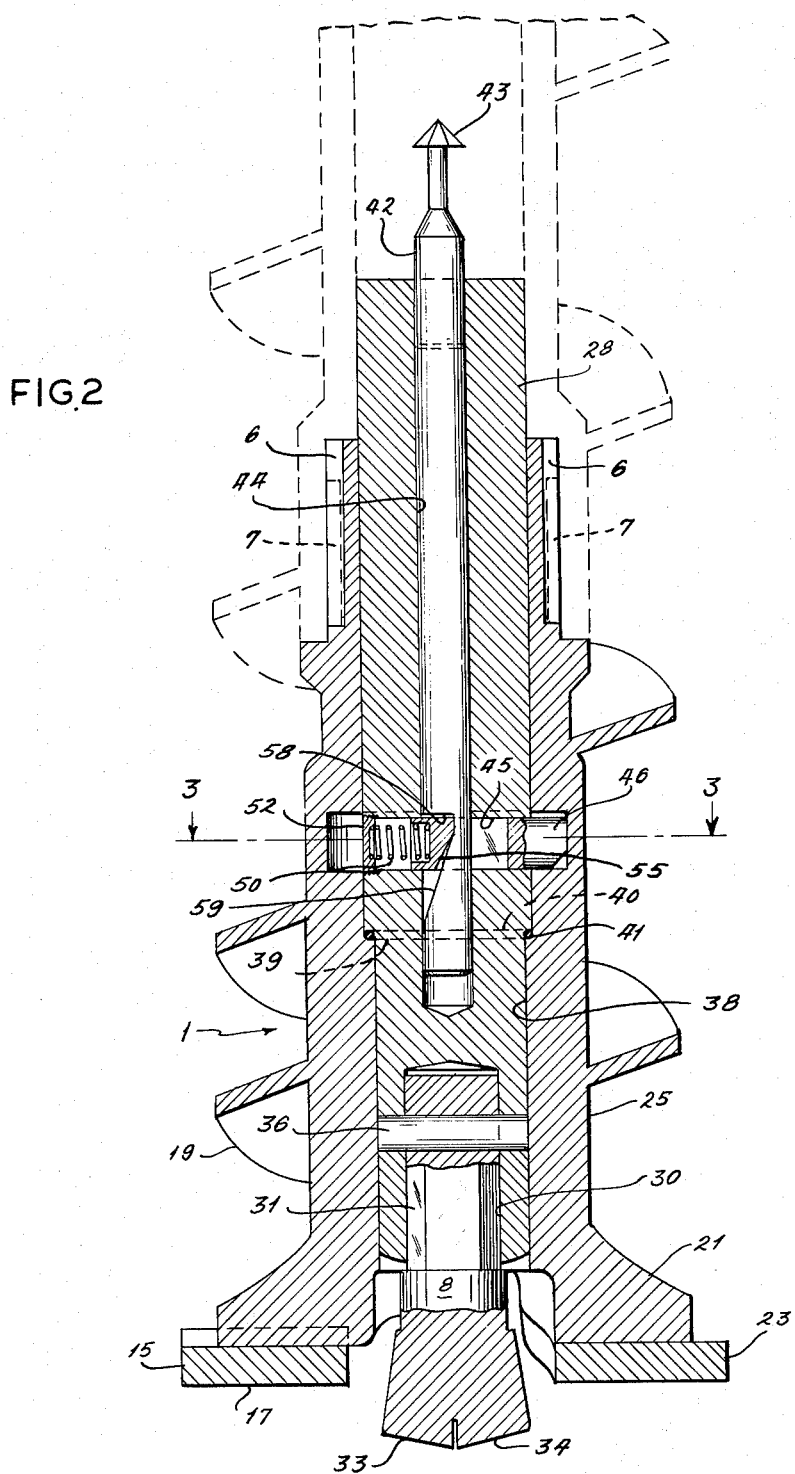
FIG. 2 is a transverse vertical section taken on a diameter through the drill bit shown in FIG. 1 to illustrate the internal construction of the earth boring bit, shown in FIG. 1.
Figure 8:
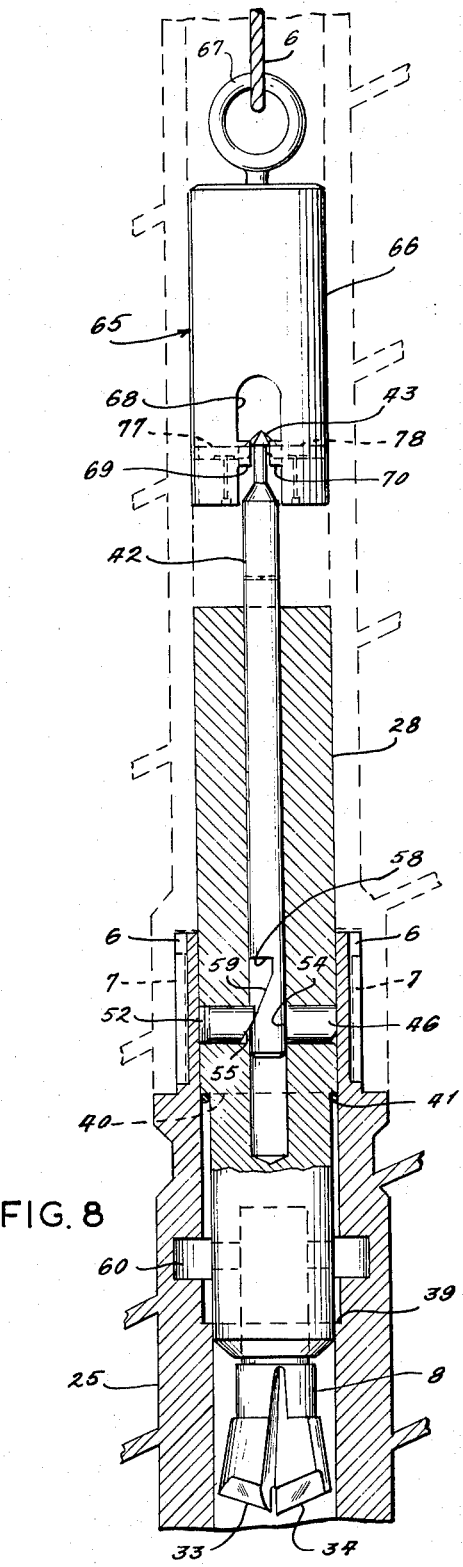
FIG. 8 is a view similar to FIG. 7 illustrating the manner of withdrawing the plug from the earth boring bit by the fishing tool after it has been unlatched.

Referring now to FIGS. 1 and 2 and especially the latter, both the shank portion 2 and the outer part, or section, 25 of the cutting head 1 are hollow so as to form a continuous passage. This passage is filled by a removable plug-like inner part, or section, 28 which protrudes from the shank 2 and terminates at the end of a passageway in the outer cutting head 25. This end of the part 28 is socketed at 30 to receive the shank 31 carrying a pair of pilot bits 33 and 34. From the view in FIG. 1, it will be apparent that the edge of the pilot bit 34 leads the edge 24 of the trailing bit 23 both radially and axially with respect to the cutting head 1. This same relationship is true of the pilot bit 33 with respect to the cutting edge 17 of the trailing bit 15. The shank 31 is hexagonal and is received within the hexagonal shaped socket 30 to resist rotation and is removably connected in the socket by a suitable tapered drive pin 36. The hollow passage 38 receiving the inner part 28 is stepped to form an abrupt shoulder 39. The exterior surface of the inner part 28 is stepped in diameter to form the abrupt shoulder 40. Between the two shoulders is an O-ring 41 of rubber-like material forming a seal at this point against the entrance of foreign matter from the hole into the latch mechanism holding the plug 28 in place. This seal is of soft material and also acts as a cushion. This latch mechanism has an operator 42, which has a spear end 43, and a cylindrical part slidably mounted within an axial passage 44 extending from the upper end of the inner part 28. The lower end of the operator 42 is provided with a suitable cam surface to operate a latch, the details of which are best shown in FIGS. 3 through 5.

Referring to FIGS. 2 through 5, there is a transverse cylindrical hole 45 intersecting the axial passage 44 slidably receiving the operator 42. Within the transverse diametrically extending hole 45 is a cylindrical latch 46. One end of the latch 46 is chamfered at 47 to act as a cam and retract the latch should the inner part be dropped down the drill string. The opposite end of the latch 46 has a seat 49 for a coil spring 50 compressed between this seat 49 and the inner surface of a screw plug 52 which is threadedly mounted in one end of the cylindrical passage 45. Latch 46 is slotted at 53 intermediate its ends to form a shoulder 54 and an inclined cam surface 55. On the lower end of the operator 42 is a half round section 57 extending from its lower end upwardly to a shoulder 58. This half round section 57 is notched at 59 angularly with respect to the axis of the operator 42 to form a cam surface. Cam surface 59 bears against cam surface 55 on latch 46, and the half round section 57 extends through the notch 53 of the latch 46. Shoulder 58 limits downward movement of the operator 42 by contact with the upper surface of the latch 46. Slot 53, at its narrowest point, is wide enough to pass half round section 57 during assembly. After assembly, the travel of latch 46 to retracted position is limited by plug 52. As shown in FIG. 3, the distance 56 does not allow the latch to clear the hole so that operator 42 cannot be withdrawn from latch 46.

Extending annularly internally of the outer part, or section, at the latch location is a channel 60 into which the end of latch 46 projects. The channel 60 extends for the full circumference internally of the hollow shank 2 and contains a key, or lug, 62 recessed within the confines of the circumferential channel 60. Since it is wholly within the channel and recessed in this manner, shown in FIG. 3, latch end 46 may engage within the channel even if it is aligned with the inner face of the key 62.

Returning now to FIG. 2, it will be apparent that when the operator 42 is in its lower position and supported on the latch by contact with the shoulder 58, spring 50 is enabled to expand driving the latch end into the channel 60 whereby the parts are locked together against relative axial movement and the inner part, or plug, 28 maintained in position with respect to the outer part 25 of the cutting head. As the outer part of the cutting head is rotated by the drill string 3, bits 33 and 34 will dig into the earth holding the plug 28 stationary until key 62 contacts the side of latch 46 to drivingly interconnect the plug 28 with the cutting head 25. With the parts in this position, the inner and outer parts of the cutting head and pilot bits 33 and 34 rotate as a unit with the bits positioned as in FIG. 1.

It will be also appreciated from the prior detailed description that any force upwardly on the operator 42 will cause a thrust of the cam surface 59 against the cam surface 55 tending to withdraw the latch 46 to retracted position. When this force is great enough to overcome the force of the spring 50 and the friction between the parts, latch 46 is fully retracted releasing the inner part, or section, 28 from the outer part 25 of the cutting head 1. This operation could be effected by any suitable fishing tool, but the preferred form of tool for this purpose and its operation is shown in the drawings by FIGS. 5 through 9.

Turning to these particular views, the tool, generally indicated as 65, has a cylindrical body 66 to which is attached a lifting eye 67 for a cable. The lower end of the body 66 is slotted diametrically at 68 so as to form a pair of oppositely disposed internally facing ribs 69 and 70. Rib 69 has a part circular recess 72 formed midway its ends and rib 70 is similarly recessed at 73. Together these recesses in the ribs 69 and 70 form a through passage axially of the tool 65 to pass the spear end 43 of the operator 42 and form a socket in which the spear end 43 is received. A diametrically extending hole 75 bisects the ribs 69 and 70 as well as the socket formed by recesses 72 and 73. Both parts of hole 75 contain a similar latch mechanism, consequently, a description of one will serve for both. This latch mechanism in the hole 75 consists of a cylindrical pin 77 with a chamfered point 78. Pin 77 is pressed inwardly of the tool 65 by a spring 79 compressed between a plug 80 threaded into the opening in the side of the tool 65. Each pin 77 is held against rotation by the engagement of screws 82 at right angles to each pin 77. The flat end of each screw 82 slidably engages a flat 83 on each pin 77, and limits its inward travel into the socket formed by recesses 72 and 73. This tool 65 has sufficient weight so that when it is lowered rapidly on its cable support, there will be sufficient force to retract pins 77 when they strike the upper end of the spear 43 so that the spear will pass into the slot 68, and pins 77 engage the flat under surface of the spear 43. The tapered end of the spear strikes the chamfered surfaces on the lower edge of each pin 77 wedging the pins apart. When the spear end passes, the pins are forced by the springs inwardly to prevent escape of the spear 43. A subsequent upward strain on the cable connected with the tool 65 operates the latch mechanism to retract latch 46 releasing the plug 28 from the cutting head 25 so that it may be withdrawn.

Figure 7:
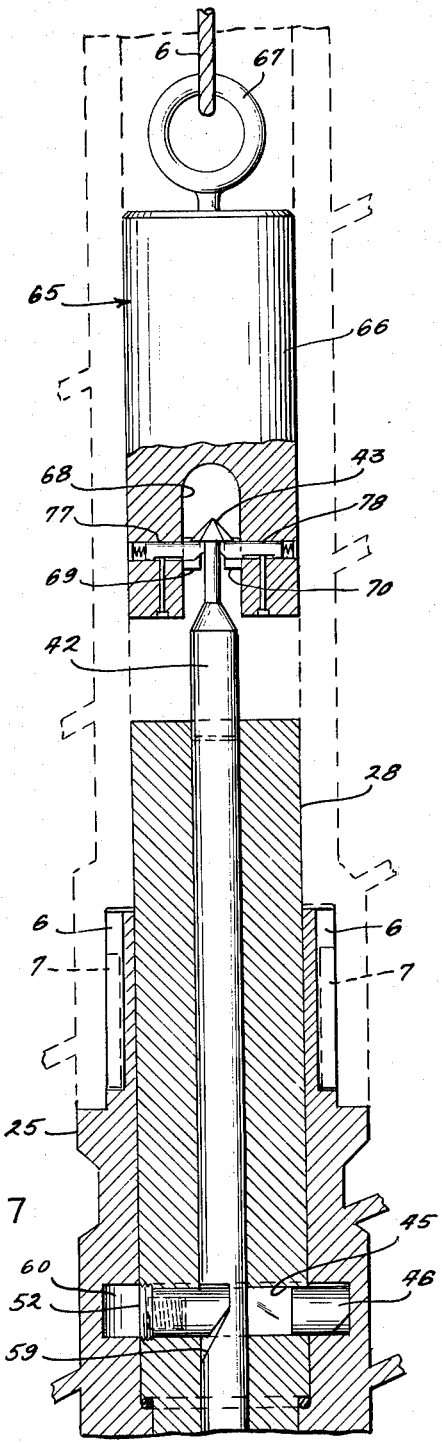
FIG. 7 is an operational view partly in section illustrating the manner of using the fishing tool, shown in FIGS. 5 and 6, to unlatch the plug.

FIG. 7 is an operative view illustrating this particular step in the process of operating the equipment. As the operator 42 is pulled upwardly in FIG. 8, latch 46 is retracted, but since cam surfaces 59 and 55 are still engaged, further upward pull on the tool 65 actually withdraws the inner part 28. After the plug 28 has been withdrawn from the outer part of the cutting head 25, it may be raised through the drill string 3 to the surface of the hole and removed. The fishing tool is removed from the spear 43 by moving the spear 43 out of the socket formed by recesses 72 and 73 into the upper part of the slot 68. The operator can then be moved sideways out of the slot 68. This socket prevents the operator 42 from falling out of the tool.

Thereafter the sampling operation may be performed through the hollow drill string and hollow cutting head 25 permitting access to the bottom of the hole. When this step has been completed, the sampling tube in turn is withdrawn from the drill string and the sample recovered. Before drilling is resumed, it is then necessary to replace the plug-like inner part 28 and the tools for performing this step are best shown in FIGS. 9–12.

With specific reference to FIGS. 10 and 11, tool 90 has a jar part and a clutch part. The jar part is a body portion 91 to which is connected a lifting eye 92 for a cable attachment. Extending axially from the lower end of the tool 90 is a cylindrical rod 94. Slidably mounted on the rod 94 is the clutch, or coupling part, 96. This part is connected slidably to the rod 94 by a pin 97 extending through a slot 98 in the rod 94. Clutch part 96 has a cylindrical hole 99 in which the rod 94 is slidable and a hole 100 extends diametrically through the body of the clutch part 96. In the hole 100 are a pair of balls 101 and 102 pressed inwardly by coil springs 103 and 104, respectively. The coil springs are held in place by suitable plugs 106 and 107 threaded into the outer ends of the hole 100. The balls 101 and 102 are prevented from being forced out of the hole 100 by lips surrounding the hole 100 where it intersects the hole 99.

As shown in FIG. 9, operator 42 has a transverse hole 110 which is exposed when the operator 42 has moved the latch 46 to full retracted position. This hole 110 is of a suitable size to receive a pin 112 with a T-shaped handle. In order to connect the tool 90 with the operator 42, it is necessary to retain the operator 42 in the latch retracted position, shown in FIG. 9. To do this, pin 112 is provided, which can be inserted through hole 110 to prevent relative movement between operator 42 and plug 28. With the operator 42 held in its latch retracted position, then it is possible to connect the clutch part 96 with the operator 42. This operation can be performed manually. As the clutch is forced onto the operator 42, the balls 101 and 102 will be retracted as they contact the spear end 43 due to the cam action of the conical surface on the balls 101 and 102. After the spear end 43 passes the balls of clutch part 96, the balls securely grip beneath the spear end 43. Even if the end of rod 94 contacts the spear end, the connection between the clutch 96 and the spear will be retained due to the fact that the operator 42 is held from movement into the plug-like inner part 28 by the pin 112. After the connection is made, the cable is raised suspending the plug-like inner part 28 from the tool 90. At this point, pin 112 is withdrawn and the tool and plug lowered through the drill string into the outer hollow part 25. When shoulder 40 and ring cushion 41 strike shoulder 39, further downward movement of the plug 28 is arrested, but further downward movement of jar part 91 of the tool 90 continues. The downward movement of the jar 91 causes the end of rod 94 to strike the spear end 43 of the operator 42. Since the operator is no longer held by the pin 112, it will be driven downwardly out of engagement from between the balls 101 and 102 and latch 46 will engage in the annular channel 60 locking the parts of the plug 28 into the cutting head 25 locking the plug-like inner part against relative axial movement with respect to the outer part. Tool 90 is then withdrawn, having performed its function, and removed from the drill string so that drilling can begin. As heretofore mentioned as outer part 25 rotates, the pilot bits 33 and 34 will hold the plug-like inner part 28 stationary for a part of a turn until key 62 strikes the side of the latch 46, thus, rotatably connecting the plug-like inner part 28 with the hollow outer part 25. The parts of the earth boring bit 1 then continue to perform their boring operation in this relationship until it is necessary to halt the process for the purpose of obtaining another earth sample. The steps are then repeated as heretofore described.

Changes in and modifications of the construction described may be made without departing from the spirit of my invention or sacrificing its advantages.

Having thus described the invention, what is claimed and desired to be secured by Letters Patent is:

1. In a rotary earthboring tool for subsurface exploration having, (a) a head provided with a central opening at one end, (b) a shank on said head with means for connection with a hollow drill string, (c) a passage in said head and shank forming a continuation of the passage in said hollow drill string, (d) a plug-like inner part slidable through the drill string and into the passage in said head for closing said opening, the improvement comprising,
   (1) shoulder means on said plug-like inner part and in the passage in said head engageable to limit movement of said plug-like inner part into said head,
   (2) retractable latch means between said plug-like inner part and the outer part of said head, said latch means comprising a latch pin slidably mounted in a transverse passage in the plug-like inner part and a channel extending annularly internally in the wall defining the passage in the said head, toward which channel the latch pin is biased, said latch pin having a cam surface, means for biasing said latch pin radially outwardly of said plug-like inner part, said latch pin and channel being arranged to interlock said parts against relative axial movement when said plug-like inner part is positioned by said shoulder means,
   (3) a key in said annularly internally extending channel in the head, positioned to be engaged by said latch pin to hold said parts against relative rotation when held against relative axial movement,
   (4) an operator mounted in said plug-like inner part for limited axial movement with respect thereto, said operator including means acting upon said latch pin cam surface when said operator is moved axially upwardly with respect to said plug-like inner part for disengaging said latch pin from said channel and means accessible from above said plug-like inner part, engageable by a fishing tool to permit withdrawing said plug-like inner part from said head and drill string to thereby provide for passage of a sample taking tool,
   (5) cutting bits mounted on said head and extending radially thereof, and
   (6) pilot bits carried by said plug-like inner part and protruding through the opening in said head, when said plug-like inner part is seated in said head, said pilot bits having their cutting edges disposed in leading relation to said auger mounted bits both axially and radially.

2. Earth boring equipment adapted for subsurface exploration by sample taking, including a cutting head with a hollow outer section defining a through passage having a shoulder therein, a hollow shank forming a continuation of said through passage and provided with a coupling part, cutting bits on said cutting head around said passage, a hollow drill string connected to said coupling part, a selectively mountable and demountable plug-like inner part having bits secured thereto and having a shoulder thereon, said plug-like inner part being slidable through said drill string into the through passage of said outer section until said shoulders seat with respect to one another to close said passage and position the bits of the plug-like inner part for cutting, a releasable latch means connecting said plug-like inner part in said hollow outer section against relative axial and rotary movement, and an operator for said latch means, said operator being mounted in said plug-like inner part for limited axial movement with respect to said plug-like inner part and having means for disengaging said latch means when the operator is in its axially upper position, said operator having a part accessible above said plug-like inner part, and means for removing said plug-like inner part through said drill string to permit sample taking, comprising,
   (a) a cable operated fishing tool including a body of a diameter to pass through said drill string, said body having a slot extending axially inwardly from a lower end of said body and diametrically of said body from openings at opposite sides of said body, facing ribs on opposite sides of said slot intermediate its axial length, recesses formed intermediate the length of said ribs defining an axial passage for receiving the said accessible part of said operator, latch elements movably mounted in said body and means biasing said latch elements toward a position at which they obstruct said axial passage, said elements being urged open by said accessible part of said operator as said fishing tool is moved toward said operator to pass the upper end of said accessible part of said operator into said axial passage through said recesses and said biasing means urging said latch elements inwardly to engage said accessible part of said operator below its upper end when the said upper end has entered said axial passage, said slot permitting selective release of said accessible part of said operator from said latch elements after it has been engaged by said latch mechanism, by relative radial movement of said operator with respect to said slot.

3. In earth boring equipment adapted for subsurface exploration by sample taking, including a cutting head with a hollow outer section defining a through passage having a shoulder therein, a hollow shank forming a continuation of said through passage and provided with a coupling part, cutting bits on said cutting head around said passage, a hollow drill string connected to said coupling part, a plug-like inner part with bits slidable through said drill string into said through passage, said plug-like inner part having a shoulder complementary to said passage shoulder for seating therewith to close said passage and position the bits for cutting, a releasable latch means connecting said plug-like inner part in said hollow outer section against relative axial and rotary movement, and an operator for said latch means movable axially with respect to said plug-like inner part and accessible through said drill string for releasing said latch means and removing said plug-like inner part from said outer section of said cutting head, the improvement comprising means for replacing said plug-like inner part through said drill string after the sample taking operation has been performed by removing said plug-like inner part, said means, comprising,
   (a) a cable operated jar device for replacing and latching said plug-like inner part in said cutting head, said jar device having a releasable clutch part for connection with the said accessible part of said operator to suspend said plug-like inner part during lowering through said drill string into said through passage in said cutting head, a jar part slidably connected with said clutch part and normally spaced therefrom when suspended in said drill string but movable with respect to said clutch part to strike said accessible part of said operator a blow and release it from said clutch part by driving said operator axially downwardly into said plug-like inner part when said plug-like inner part is seated in said passage, thereby to move the operator from its latch means disengaging position to permit the said latch means to move to engaging position in said plug-like inner part.

4. The improvement of claim 3 wherein the jar has a cylindrical body with an eye at an upper axial end thereof and an axially extending rod at its opposite axial end, and the clutch part includes a cylindrical body with an axial passage through it, a pin mounted in the said body and extending diametrically of the axial passage, a diametrically extending hole through said body at a place axially below the said pin, clutch elements slidably mounted in said diametrically extending hole and adapted to project into the axial passage, and biasing means arranged to bias said clutch elements toward the axial passage, said rod being slidably mounted in the said axial passage and having an axial slot through which the pin extends slidably to interconnect the cylindrical jar body and the clutch part, said slot being of a length to permit axial movement of said rod from a position at which its lower end is axially above said clutch elements to a position at which said lower end is axially below said clutch elements.

5. In a drill head for subsurface exploration, having a hollow outer part provided with a central opening at one end, cutting bits mounted on said hollow outer part around said central opening, means for connecting a hollow drill string to said hollow outer part, a passage in said hollow outer part forming a continuation of the passage in said hollow drill string, a plug-like inner part selectively mountable and demountable in said hollow outer part, said plug-like inner part being slidable through the drill string and into said passage for closing said opening, and a pilot bit carried by said plug-like inner part and protruding from said opening, the improvement comprising, (a) shoulder means on said plug-like inner part and in said passage engageable to limit movement of said plug-like inner part into said hollow outer part, (b) retractable latch means between said plug-like inner part and said hollow outer part including a passage in and transverse of said plug-like inner part, a passage axially of said plug-like inner part intersecting said first passage, a latch pin slidably mounted in said transverse passage, a cam surface on said latch pin disposed in said axial passage, a circumferential channel in the passage-defining inner wall of the said outer part and opening into said passage for receiving said latch pin, and spring means mounted within said transverse passage in the plug-like inner part adapted to urge said latch pin into said channel, (c) a key in said channel engaged by said latch pin to hold plug-like inner part and said outer part against relative rotation when held against relative axial movement by engagement of said patch pin, and (d) an operator movable in said passage axially of said inner part and having a part accessible through said hollow drill string, means on said operator cooperating with said cam surface on said latch pin for retracting said latch and for withdrawing said plug-like inner part from said cutting head and drill string to thereby open said through passage for sample taking operations.

6. The combination as defined in claim 5 in which said accessible operator part is a spear end extending beyond said plug-like inner part within said hollow drill string and the means on said operator for operating said latch is a cam surface slidably engaging said cam surface on said latch pin.

References Cited by the Examiner
UNITED STATES PATENTS

| | | | |
|---|---|---|---|
| 2,020,599 | 11/1935 | Barrett | 175—257 |
| 2,064,255 | 12/1936 | Garfield | 175—257 |
| 2,079,941 | 5/1937 | Labarre | 175—246 |
| 2,865,608 | 12/1958 | McKenna | 175—394 X |

CHARLES E. O'CONNELL, *Primary Examiner.*

BENJAMIN BENDETT, *Examiner.*